US009303551B2

(12) United States Patent
Kojima et al.

(10) Patent No.: US 9,303,551 B2
(45) Date of Patent: Apr. 5, 2016

(54) ENGINE START CONTROL APPARATUS FOR HYBRID VEHICLE

(75) Inventors: Susumu Kojima, Susono (JP); Naoki Nakanishi, Susono (JP); Yukihiko Ideshio, Nissin (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 260 days.

(21) Appl. No.: 14/240,487

(22) PCT Filed: Aug. 31, 2011

(86) PCT No.: PCT/JP2011/069793
§ 371 (c)(1),
(2), (4) Date: Feb. 24, 2014

(87) PCT Pub. No.: WO2013/030985
PCT Pub. Date: Mar. 7, 2013

(65) Prior Publication Data
US 2014/0209059 A1    Jul. 31, 2014

(51) Int. Cl.
*F02B 17/00* (2006.01)
*B60K 6/48* (2007.10)
(Continued)

(52) U.S. Cl.
CPC .................. *F02B 17/005* (2013.01); *B60K 6/48* (2013.01); *B60K 6/54* (2013.01); *B60W 10/02* (2013.01);
(Continued)

(58) Field of Classification Search
CPC ....... F02D 41/00; F02D 41/06; F02D 41/068; F02B 17/00; F02B 17/005; F02N 9/02; F02N 11/08; F02N 15/00; F02N 2200/22; F02N 2200/0801; F02N 2200/0802; F02N 2200/0812; B60W 10/02; B60W 10/06; B60W 20/00; B60W 2510/2041; B60W 2510/0638; B60W 2510/0661; Y02T 10/62; Y02T 10/6221; Y02T 10/6213; Y02T 10/623

USPC ......... 123/294–299, 305, 491, 179.1, 179.16, 123/179.8; 701/103–105
See application file for complete search history.

(56) References Cited

U.S. PATENT DOCUMENTS

| | | | |
|---|---|---|---|
| 2002/0170758 A1* | 11/2002 | Shimabukuro | B60K 6/48 180/65.25 |
| 2004/0200448 A1 | 10/2004 | Kojima et al. | |
| 2009/0105038 A1 | 4/2009 | Weiss et al. | |
| 2014/0080663 A1* | 3/2014 | Nakanishi | B60W 30/18 477/5 |
| 2014/0094340 A1* | 4/2014 | Yoshikawa | B60W 20/10 477/5 |

FOREIGN PATENT DOCUMENTS

| | | |
|---|---|---|
| JP | 2004-301080 A | 10/2004 |
| JP | 2004-316455 A | 11/2004 |

(Continued)

*Primary Examiner* — John Kwon
*Assistant Examiner* — Johnny H Hoang
(74) *Attorney, Agent, or Firm* — Kenyon & Kenyon LLP (57) ABSTRACT

In a hybrid vehicle, when using an ignition start to start a direct injection engine while any one of the cylinders has stopped near top dead center, engine revolutions are raised by producing a first explosion in a first cylinder, which is situated before a second cylinder in an ignition sequence and is in an expansion stroke and in which an exhaust value is not open, by directly injecting fuel into the first cylinder and igniting the fuel. Furthermore, assistance in increasing the engine revolutions is started by transmitting assist torque output from a motor-generator to the direct injection engine via a clutch, in a peak section immediately after the start of increase in the engine revolutions. The stopped direct injection engine can be started using a sufficient required assist torque, namely, electrical energy, whereby the electrical energy for engine starting that is always reserved in a battery (accumulator apparatus) is reduced and therefore a travel range is increased and vehicle fuel consumption is improved appropriately.

8 Claims, 7 Drawing Sheets

(51) Int. Cl.
*B60K 6/54* (2007.10)
*B60W 10/02* (2006.01)
*B60W 10/06* (2006.01)
*B60W 10/08* (2006.01)
*B60W 20/00* (2006.01)

(52) U.S. Cl.
CPC ............... *B60W 10/06* (2013.01); *B60W 10/08* (2013.01); *B60W 20/00* (2013.01); *B60W 20/40* (2013.01); *B60W 2510/0685* (2013.01); *B60Y 2300/432* (2013.01); *B60Y 2300/48* (2013.01); *Y02T 10/6221* (2013.01); *Y02T 10/6286* (2013.01)

(56) References Cited

FOREIGN PATENT DOCUMENTS

| | | |
|---|---|---|
| JP | 2005-002847 A | 1/2005 |
| JP | 2009-527411 A | 7/2009 |
| JP | 2010-077859 A | 4/2010 |
| WO | 2013/014797 A1 | 1/2013 |
| WO | 2013/030985 A1 | 3/2013 |
| WO | 2013/030986 A1 | 3/2013 |
| WO | 2013/030987 A1 | 3/2013 |

* cited by examiner

FIG. 8 ered the exhaust stroke (for example, near
ENGINE START CONTROL APPARATUS FOR HYBRID VEHICLE

CROSS-REFERENCE TO RELATED APPLICATIONS

This is a national phase application based on the PCT International Patent Application No. PCT/JP2011/069793 filed on Aug. 31, 2011, the entire contents of which are incorporated herein by reference.

TECHNICAL FIELD

The invention relates to an engine start control apparatus for a hybrid vehicle provided with a direct injection engine.

BACKGROUND ART

There is a conventional hybrid vehicle which has a direct injection engine that injects fuel directly into cylinders, a clutch that engages and disengages (connects and disconnects) the direct injection engine with respect to a power transmission path, and a rotary machine which functions as at least an electric motor, wherein the direct injection engine and the rotary machine can be used as sources of drive power for travel. The hybrid vehicle described in Patent Document 0.1 is one example thereof. In a hybrid vehicle of this kind, direct coupled start technology has been proposed, namely, ignition start technology whereby fuel is injected into a cylinder and ignited during an expansion stroke, in response to an engine start request in a state where the engine is stopped, for instance, during motorized travel when the vehicle is traveling by using only the rotary machine as a drive power source, or when the vehicle is stationary.

Patent Document 1: Published Japanese Translation of PCT Application No. 2009-527411

SUMMARY OF THE INVENTION

Patent Document 1 sets forth, as a desirable condition for a successful direct coupled start (starting ignition), that when a direct injection engine is in a stopped position, the crank angle CA in a prescribed cylinder should be in an angular range of 100° to 120° after passing top dead center (TDC), and states that an engine control unit identifies a position beneficial to a direct coupled start, and implements fuel injection and ignition.

However, the crank angle CA when the direct injection engine is stopped is not necessarily limited to the desirable angular rate for so-called ignition starting to start up rotation of the engine by injecting fuel into a cylinder in the expansion stroke and igniting the fuel, and there is about a 10% of a probability of the crank angle CA stopping near the top dead center (compression TDC) at the end of the compression stroke. In the relationship between the crank angle at the end of the expansion stroke (0°=compression TDC), the positional energy (pumping energy) due to pumping, and the assist torque required for starting, whatever the number of cylinders, there is a peak of the pumping energy at the compression TDC where the crank angle CA is in the vicinity of 0°, and the crank shaft may stop close to this peak, due to an equilibrium in the direction of rotation and friction in the engine. In this state, the air volume in the cylinder performing the initial explosion is not necessarily sufficient, the rotational force obtained by the initial explosion is small, and the rise in the engine revolutions may be insufficient.

On the other hand, when starting a direct injection engine which has stopped near the compression TDC, it is conceivable that raising of the engine revolutions upon starting the direct injection engine may be assisted by driving the crank shaft by a rotary machine in response to an engine start request. However, if the raising of the rotational speed during start-up of the direct injection engine is assisted by driving the crank shaft using a rotary machine, then the amount of electrical energy consumed by the accumulator device when starting the direct injection engine is large, and therefore electrical energy for starting the engine must always be reserved in the accumulator device, thereby restricting the electric motor travel range, and presenting an obstacle to improvement in the fuel consumption of the vehicle.

For example, in the case of an eight-cylinder engine, if the crank shaft stops near the compression TDC, then the preceding cylinder has a crank angle of approximately 90° and is still in the expansion stroke, which means that ignition starting is possible, but since the exhaust valve will soon open and the cylinder will enter the exhaust stroke (for example, near 120°), then sufficient rotational energy cannot be expected, the raising of the engine revolutions is weak, and therefore a large assist torque is required for starting.

The invention was devised in view of these circumstances, an object thereof being to provide an engine start control apparatus for a hybrid vehicle in which a direct injection engine is engaged and disengaged with respect to a power transmission path by a clutch, wherein an engine start can be performed using a sufficient required assist torque when using an ignition start to start the direct injection engine while any one of a plurality of cylinders has stopped near the top dead center.

In order to achieve this object, a first invention is an engine start control apparatus for a hybrid vehicle having (a) a direct injection engine directly injecting fuel into cylinders, (b) a clutch connecting and disconnecting the direct injection engine with respect to a power transmission path, and (c) a rotary machine functioning at least as an electric motor, (d) the direct injection engine and the rotary machine being able to be used as drive power sources for travel, (e) wherein, when the direct injection engine is started up in a state where a prescribed second cylinder of a plurality of cylinders is positioned at top dead center, engine revolutions are raised by producing a first explosion in a first cylinder situated before the second cylinder in an ignition sequence, the first cylinder being in an expansion stroke and an exhaust valve thereof not being open, by directly injecting fuel into the first cylinder and igniting the fuel, and furthermore assistance in increasing the engine revolutions is started by transmitting assist torque output from the rotary machine to the direct injection engine via the clutch, in a peak section immediately after the engine revolutions start to increase.

A second invention is the engine start control apparatus for a hybrid vehicle according to the first invention, wherein assistance in increasing the engine revolutions by the assist torque output from the rotary machine is started in response to a time point at which the engine revolutions shift to an initial decrease from an initial increase due to the raising of the engine revolutions.

A third invention is the engine start control apparatus for a hybrid vehicle according to the second invention, wherein a second explosion following the first explosion is produced in a third cylinder following the second cylinder in the ignition sequence, by directly injecting fuel into the third cylinder and igniting the fuel near top dead center of the third cylinder.

A fourth invention is the engine start control apparatus for a hybrid vehicle according to the third invention, wherein assistance in increasing the engine revolutions by the assist torque output from the rotary machine is continued at least until the third cylinder has passed the top dead center.

A fifth invention is the engine start control apparatus for a hybrid vehicle according to the first to fourth inventions, wherein assistance in increasing the engine revolutions by the assist torque output from the rotary machine is continued at least until the engine revolutions exceed a predetermined revolutions determination value and/or until a rate of increase of the engine revolutions exceeds a predetermined rate-of-increase determination value.

A sixth invention is the engine start control apparatus for a hybrid vehicle according to the first to fifth inventions, wherein the assist torque output from the rotary machine is set to a magnitude whereby the engine revolutions decrease temporarily after the increase and then increase again.

A seventh invention is the engine start control apparatus for a hybrid vehicle according to the first to sixth inventions, wherein the direct injection engine is provided with a plurality of cylinders being no fewer than five cylinders.

An eighth invention is the engine start control apparatus for a hybrid vehicle according to the first to seventh inventions, wherein, when rotation of a crank shaft of the direct injection engine is not raised by the first explosion in the first cylinder, the engine revolutions are increased by transmitting the assist torque output from the rotary machine to the direct injection engine via the clutch.

According to the engine start control apparatus for a hybrid vehicle according to the first invention, when the direct injection engine is started up in a state where a prescribed second cylinder of a plurality of cylinders is positioned at top dead center, the engine revolutions are raised by producing a first explosion in a first cylinder situated before the second cylinder in an ignition sequence, the first cylinder being in an expansion stroke and an exhaust valve thereof not being open, by directly injecting fuel into the first cylinder and igniting the fuel, and furthermore assistance in increasing the engine revolutions is started by transmitting assist torque output from the rotary machine to the direct injection engine via the clutch, in a peak section immediately after the engine revolutions start to increase. Therefore, in the hybrid vehicle which connects and disconnects a direct injection engine with respect to a power transmission path by a clutch, the direct injection engine which has stopped can be started by using a sufficient required assist torque. Furthermore, as a result of this, the consumption of the electrical energy of the accumulator apparatus in starting the direct injection engine is reduced, the electrical energy for engine starting which is to be reserved in the accumulator apparatus at all times is reduced, and therefore the electric motor travel range is increased and the fuel consumption of the vehicle is improved appropriately.

According to the engine start control apparatus for a hybrid vehicle according to the second invention, assistance in increasing the engine revolutions by the assist torque output from the rotary machine is started in response to the time point at which the engine revolutions shift to an initial decrease from an initial increase due to the raising of the engine revolutions, and therefore an assist is performed in the vicinity of the maximum value immediately after raising of the engine revolutions, then the torque assist is started at an appropriate timing which does not waste mechanical energy to turn the crank shaft. Consequently, the direct injection engine which is stopped can be started by using a sufficient required assist torque, and starting of the direct injection engine can be performed rapidly.

According to the engine start control apparatus for a hybrid vehicle according to the third invention, since a second explosion following the first explosion is produced in a third cylinder following the second cylinder in the ignition sequence, by directly injecting fuel into the third cylinder and igniting the fuel near top dead center of the third cylinder, then the consumption of the electrical energy of the accumulator apparatus in starting the direct injection engine is further reduced, the electrical energy for engine starting which is to be reserved in the accumulator apparatus at all times is reduced, and therefore the electric motor travel range is increased and the fuel consumption of the vehicle is improved further.

According to the engine start control apparatus for a hybrid vehicle according to the fourth invention, since assistance in increasing the engine revolutions by the assist torque output from the rotary machine is continued until the third cylinder has passed the top dead center, then the direct injection engine which is stopped can be started by using a sufficient required assist torque, and starting of the direct injection engine can be performed reliably.

According to the engine start control apparatus for a hybrid vehicle according to the fifth invention, since assistance in increasing the engine revolutions by the assist torque output from the rotary machine is continued until the engine revolutions exceed a predetermined revolutions determination value and/or until a rate of increase of the engine revolutions exceeds a predetermined rate-of-increase determination value, then the direct injection engine which is stopped can be started by using a sufficient required assist torque, in other words, electrical energy, and starting of the direct injection engine can be performed reliably.

According to the engine start control apparatus for a hybrid vehicle according to the sixth invention, since the assist torque output from the rotary machine is set to a magnitude whereby the engine revolutions decrease temporarily after the increase and then increase again, the stopped direct injection engine can be started by using a sufficient required assist torque, and furthermore, the consumption of the electrical energy of the accumulator apparatus in starting the direct injection engine is further reduced, the electrical energy for engine starting which is to be reserved in the accumulator apparatus at all times is reduced, and therefore the electric motor travel range is increased and the fuel consumption of the vehicle is improved further.

According to the engine start control apparatus for a hybrid vehicle according to the seventh invention, the direct injection engine is a four-cycle direct injection engine provided with a plurality of cylinders being no fewer than five cylinders. If the direct injection engine is a four-cycle direct injection engine having five or more cylinders, in other words, a six-cylinder, eight-cylinder or 12-cylinder direct injection engine, then when the direct injection engine is started in a state where a prescribed cylinder, the second cylinder, is positioned at the top dead center, there exists a first cylinder which is situated before that second cylinder in the ignition sequence, which is in an expansion stroke, and in which the exhaust valve is not open, and therefore it is possible to start the engine by raising the engine revolutions through directly injecting fuel into the first cylinder and igniting the fuel to produce a first explosion in the first cylinder, and by using a sufficient required assist torque. Moreover, as a result of this, the consumption of the electrical energy of the accumulator apparatus in starting the four-cycle direct injection engine having five or more cylinders is reduced, the electrical energy for engine starting that is to be reserved in the accumulator apparatus at all times is reduced, and therefore the electric motor travel range is increased and the fuel consumption of the vehicle is improved appropriately.

According to the engine start control apparatus for a hybrid vehicle according to the eighth invention, when rotation of a crank shaft of the direct injection engine is not raised by a first explosion in the first cylinder, the engine revolutions are increased by transmitting assist torque output from the rotary machine to the direct injection engine via the clutch, and therefore, if, for any reason, a rise in the engine revolutions cannot be obtained by beginning an ignition start, then the engine revolutions are increased by transmitting the assist torque output from the rotary machine to the direct injection engine via the clutch, thus guaranteeing the responsiveness of the starting operation.

BRIEF DESCRIPTION OF THE DRAWINGS

FIG. 6 is a cylinder phase diagram illustrating an ignition start process in the V-8 four-cycle direct injection engine in FIG. 1; in which FIG. 6A shows a stopped state where a prescribed second cylinder is positioned at the compression TDC, FIG. 6B shows a state where fuel injection and ignition have been performed in a first cylinder which is one before the second cylinder K2 in the ignition sequence, which is in an expansion stroke in this stopped state, and in which the exhaust valve is not open, FIG. 6C shows a state where an initial explosion has occurred due to the ignition in the first cylinder and rotation has started (start-up) due to the torque produced by this initial explosion, and depressurization inside the second cylinder and compression inside a third cylinder have started, FIG. 6D shows a state where further rotation has occurred due to the torque produced by the initial explosion, and the depressurization in the second cylinder and the compression inside the third cylinder have progressed further, FIG. 6E shows a state where the third cylinder in the compression stroke has reached the TDC and fuel injection and ignition have been carried out in the third cylinder, and FIG. 6F shows a state where further rotation has occurred due to the torque produced by a second explosion in the third cylinder, and the expansion in the third cylinder and the compression in the fourth cylinder K4 have progressed further.

MODES FOR CARRYING OUT THE INVENTION

Here, desirably, the invention is used in a hybrid vehicle of a parallel type, or the like, in which a direct engine is engaged and disengaged with respect to a power transmission path by a clutch, and is applied to engine start control in a motor travel mode where the vehicle travels by using only a rotary machine as a drive power source, or when a direct injection engine is started in a stationary state of the vehicle where the direct injection engine has been stopped. For the clutch, it is desirable to use a frictional engaging clutch, such as a single-plate or multi-plate clutch.

Furthermore, desirably, the hybrid vehicle according to the invention can use the direct injection engine and the rotary machine as drive power sources for travel, the rotary machine is desirably a motor-generator which can be used selectively for an electric motor function and an electric generator function. The direct injection engine desirably uses a gasoline engine, and application to a high-cylinder engine having five or more cylinders, and in particular, a six-cylinder, eight-cylinder or 12-cylinder direct injection engine, is also possible. In short, the invention can be applied to any reciprocating internal combustion engine in which an ignition start is possible by injecting fuel into a cylinder in an expansion stroke, when a prescribed first cylinder of the plurality of cylinders is positioned at the top dead center, the first cylinder is in an expansion stroke, and the exhaust valve is not open.

Furthermore, desirably, in the first invention, assistance in increasing the engine revolutions by transmitting assist torque output from the rotary machine to the direct injection engine via the clutch is started at a timing in a peak section immediately after the start of increase in the engine revolutions. Therefore, after the engine revolutions have increased due to the first explosion (initial explosion) in the first cylinder due to an ignition start, a smooth decrease section occurs until the engine revolutions rise again due to a second explosion. The peak section is a section which indicates not only a time point specifying the maximum value between the increase section and the decrease section of the engine revolutions, but also engine revolutions of no less than a value having a prescribed ratio with respect to that maximum value. The start time and end time of this maximum section are set in advance experimentally so as to reduce, as far as possible, the electrical energy consumed by the rotary machine which outputs assist torque during start-up, and so as to start the engine rapidly. The maximum value corresponds to the time point at which the engine revolutions shift from an initial increase due to raising of the engine revolutions, to an initial decrease.

Furthermore, the revolutions determination value and the rate-of-increase determination value used in the fifth invention are values for determining whether or not the direct injection engine being started has reached a state of independent rotation, and these values are set previously by experimentation.

Moreover, in the sixth invention, the assist torque output from the rotary machine is set to a magnitude where the engine revolutions increase, then decrease temporarily, then increase again. An assist torque which generates an effect whereby the engine revolutions increase, then decrease temporarily then increase again is suitable for minimizing the consumption of electrical energy and maintaining the start-up response, and desirably, the start timing and the magnitude of the assist torque are subjected to learning correction, according to requirements, in such a manner that a trough, in other words, a minimum portion, is formed immediately after the raising of the engine revolutions.

EMBODIMENTS

Embodiments of the invention are described in detail below with reference to the drawings.

Figure 1:
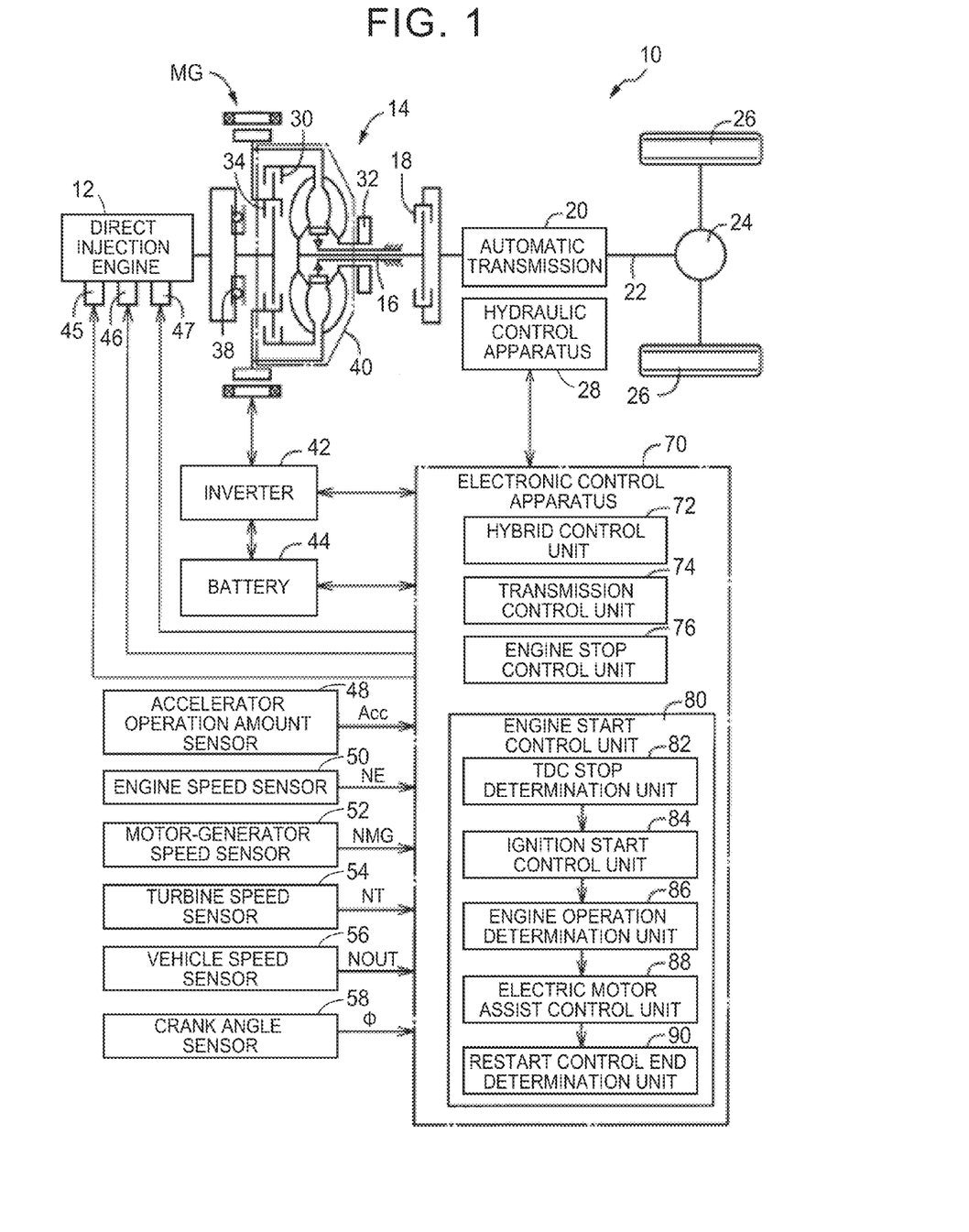
FIG. 1 is a schematic drawing showing, in a combined manner, a skeleton diagram illustrating a principal part of a mechanical composition of a hybrid vehicle to which the invention is suitably applied, and a functional block diagram illustrating a principal part of a control function of an electronic control apparatus.

FIG. 1 is a schematic diagram including a skeleton diagram of a drive system of a hybrid vehicle 10 to which the invention is desirably applied. This hybrid vehicle 10 includes, as drive power sources for travel, a direct injection engine 12 that directly injects fuel into the cylinders, and a motor-generator MG which functions as an electric motor and an electric generator. The output of the direct injection engine 12 and the motor-generator MG is transmitted from a torque converter 14, which is a fluid-type transmission device, via a turbine shaft 16 and a C1 clutch 18, to an automatic transmission 20, and is then further transmitted via an output shaft 22 and differential gear apparatus 24, to left and right drive wheels 26. The torque converter 14 is provided with a lock-up clutch 30 which directly couples a pump impeller and a turbine impeller, and furthermore an oil pump 32 is connected in an integrated fashion to the pump turbine, so as to be driven to rotate mechanically by the direct injection engine 12 or the motor-generator MG. The motor-generator MG corresponds to a rotary machine.

Figure 2:
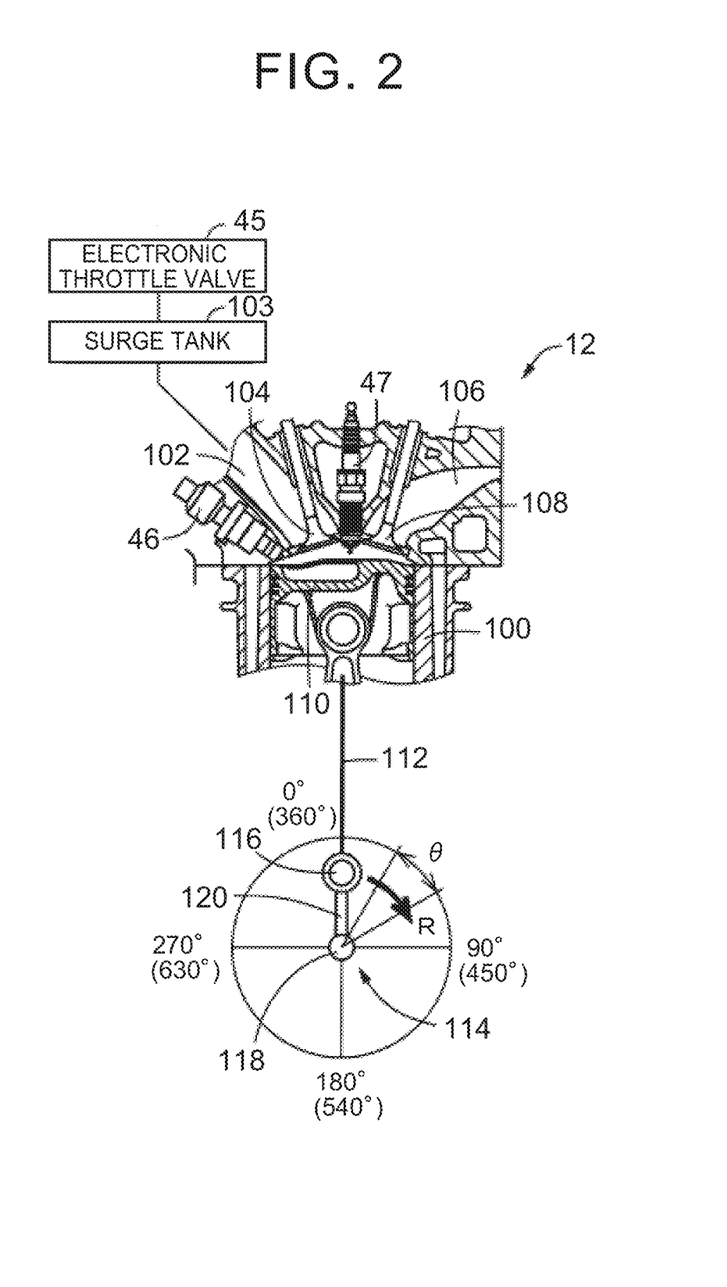
FIG. 2 is a cross-sectional diagram illustrating the direct injection engine for a hybrid vehicle in FIG. 1.

In the present embodiment, the direct injection engine 12 employs a V-8, four-cycle gasoline engine, and as shown more specifically in FIG. 2, gasoline is injected directly into the cylinder 100 by a fuel injection apparatus 46 in the state of high-pressure micro-particles. In the direct injection engine 12, air flows into the cylinder 100 from an air intake passage 102 via an air intake valve 104, and furthermore, exhaust gas is expelled from an exhaust passage 106 via an exhaust valve 108. By performing ignition at a prescribed timing by an ignition apparatus 47, the air mixture in the cylinder 100 combusts explosively and pushes the piston 110 downwards. The air intake passage 102 is connected via a surge tank 103 to an electronic throttle valve 45, which is an air intake volume adjusting valve, and the air intake amount which flows into the cylinder 100 from the air intake passage 102 in accordance with the opening of the electronic throttle valve 45 (throttle valve opening), in other words, the engine output, is thereby controlled. The piston 110 is fitted slidably in the axial direction inside the cylinder 100, and is also coupled in a relatively rotatable fashion to a crank pin 116 of a crank shaft 114 via the connecting rod 112. The crank shaft 114 is driven to rotate as indicated by the arrow R due to the linear reciprocating movement of the piston 110. The crank shaft 114 is supported rotatably by a bearing in a journal section 118, and is provided in an integrated fashion with a crank arm 120 which connect the journal section 118 and the crank pin 116.

Figure 3:
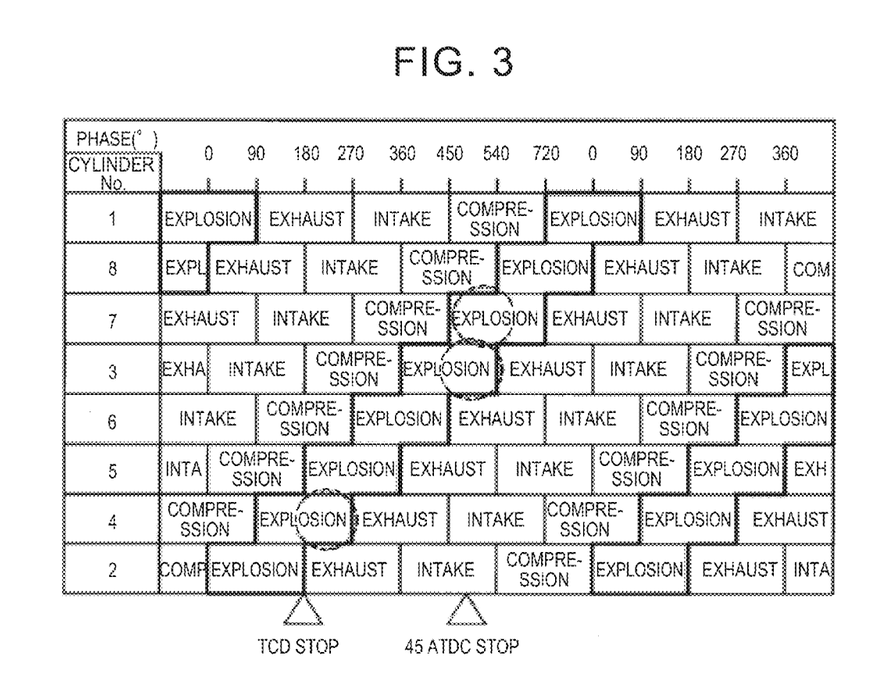
FIG. 3 is a chart illustrating a sequence of four cycle strokes executed in each cylinder in a case where the direct injection engine in FIG. 1 is a V-8 engine.

In a direct injection engine 12 of this kind, in each cylinder, four strokes, namely, an intake stroke, a compression stroke, an expansion (explosion) stroke, and an exhaust stroke, occur in two revolutions (720°) of the crank shaft 114, and by repeating these strokes, the crank shaft 114 is caused to rotate in continuous fashion. The pistons 110 of the eight cylinders 100 are composed so as to have crank angles displaced by 90° with respect to each other, in other words, the positions of the crank pins 116 of the crank shaft 114 project in directions separated respectively by 90°, and each time the crank shaft 114 rotates through 90°, explosive combustion is performed in the eight cylinders 100 in a previously established ignition sequence as shown in FIG. 3, for example, thereby continuously generating rotational torque. Furthermore, when the crank shaft 114 has rotated through a prescribed angle from the top dead center after the compression stroke of the piston 110 (compression TDC), and the piston 110 stops in a prescribed angular range θ of the expansion stroke where the air intake valve 104 and the exhaust valve 108 are both closed, then by injecting gasoline into the cylinder 100 by the fuel injection apparatus 46 and igniting the gasoline by the ignition apparatus 47, the air mixture inside the cylinder 100 is combusted explosively and an ignition start for raising the engine revolutions is possible. If the friction of each part of the direct injection engine 12 is small, then there is a possibility that the direct injection engine 12 can be started by an ignition start only, but if the friction is large, then the starting assist torque used to start the engine by cranking the crank shaft 114 can be reduced, and therefore the maximum torque of the motor-generator MG which generates this assist torque is reduced, and size reduction and lower fuel consumption can be achieved. In the angular range θ described above, a relatively large rotational energy is obtained by an ignition start in the range of approximately 30° to 60°, for example, of the crank angle CA after top dead center, and the assist torque can be reduced, and at about 90° also a relatively large rotational energy is obtained by an ignition start, and the assist torque can also be reduced.

Figure 4:
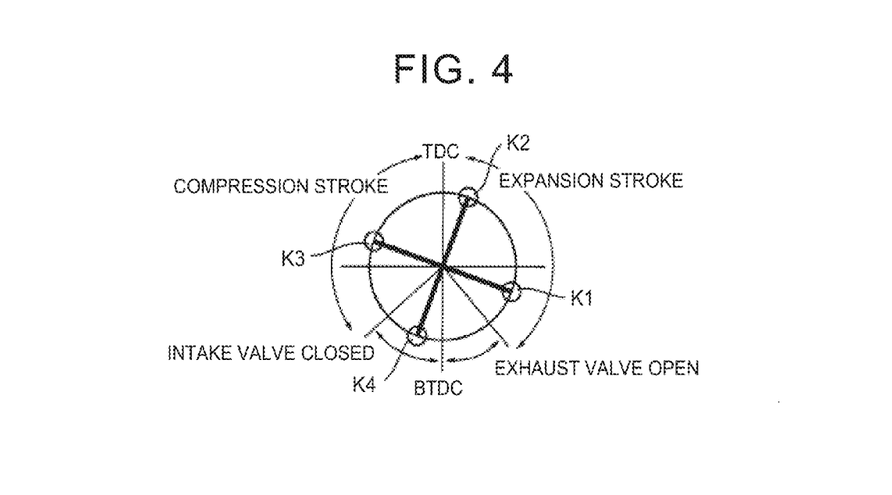
FIG. 4 is a cylinder phase diagram showing the interrelationship between the phase of four cylinders which perform an explosion in one revolution of the crank shaft in the V-8 engine in FIG. 1.

FIG. 3 is a diagram describing the sequence of actions relating to the crank angle CA of each of the cylinders No. 1 to No. 8, when the direct injection engine 12 is a V-8 engine running in 4 cycles. The cylinders No. 1 to No. 8 indicate the mechanical positional sequence of the cylinders, but in terms of the ignition sequence with reference to a crank angle CA of 0°, the sequence is cylinder No. 2, cylinder No. 4, cylinder No. 5, cylinder No. 6, cylinder No. 3, cylinder No. 7, cylinder No. 8 and cylinder No. 1. For example, if the cylinder No. 4 is taken as the first cylinder K1, in an ignition sequence, then cylinder No. 5 is the second cylinder K2, cylinder No. 6 is the third cylinder K3, and cylinder No. 3 is the fourth cylinder K4. Furthermore, FIG. 4 is a cylinder phase diagram showing the interrelationship between the phase of four cylinders which perform an explosion in one revolution of the crank shaft 114 in the V-8 engine, in which the first cylinder K1 to the fourth cylinder K4 respectively turn rightwards while remaining separated by 90° from each other, and a compression stroke which compresses the air taken in from the closing of the intake valve until reaching the TDC, and an expansion stroke in which the piston 110 is pushed down by the expansion of exploding gas from the TDC until opening of the exhaust valve, are carried out sequentially. The phase of the first cylinder K1 in FIG. 4 is situated in the second half of the expansion stroke, the phase of the second cylinder K2 is situated in the first half of the expansion stroke, the phase of the third cylinder K3 is situated in the second half of the compression stroke, and the phase of the fourth cylinder K4 is situated before the start of the compression stroke.

Returning to FIG. 1, a KO clutch 34 is provided between the direct injection engine 12 and the motor-generator MG to directly couple same via a damper 38. The KO clutch 34 is a hydraulic friction engaging apparatus, such as a single-plate or multi-plate friction clutch, which is engaged by friction by a hydraulic cylinder, and engagement and release of the KO clutch 34 are controlled by an electromagnetic linear control valve in the hydraulic control apparatus 28, in addition to which, in the present embodiment, the KO clutch 34 is provided in an oil bathed state inside an oil chamber 40 of the torque converter 14. The KO clutch 34 functions as a connection and disconnection apparatus which connects and disconnects the direct injection engine 12 to and from the power transmission path. The motor-generator MG is connected to a battery 44 via an inverter 42. Furthermore, the automatic transmission 20 is a non-continuous automatic transmission, based on a planetary gear system, or the like, in which a plurality of gears having different speed ratios are established when a plurality of hydraulic friction engaging apparatuses (clutch/brake) are in a released state, and the transmission is controlled by an electromagnetic hydraulic control valve or a switching valve, and the like, which are provided in the hydraulic control apparatus 28. The C1 clutch 18 functions as an input clutch of the automatic transmission 20, and engagement and release thereof is controlled by an electromagnetic linear control valve inside the hydraulic control apparatus 28.

The hybrid vehicle 10 of this kind is controlled by an electronic control apparatus 70. The electronic control apparatus 70 function as a controller. The electronic control apparatus 70 is constituted by a so-called microcomputer having a central processing unit (CPU), a read only memory (ROM), a random access memory (RAM) and an input/output interface, and the like, which carries out signal processing in accordance with a program previously stored in the ROM, using a temporary storage function of the RAM. The electronic control apparatus 70 is supplied with a signal representing an operation amount of an accelerator pedal (accelerator operation amount) Acc, from the accelerator operation amount sensor 48. Furthermore, the electronic control apparatus 70 is supplied with a rotational speed of the direct injection engine 12 (engine revolutions) NE, a rotational speed of the motor-generator MG (motor-generator revolutions) NMG, a rotational speed of the turbine shaft 16 (turbine revolutions) NT, a rotational speed of the output shaft 22 (output shaft revolutions, which corresponds to the vehicle speed V) NOUT, and a pulse signal $\phi$ indicating the crank angle CA, in other words, the angle of rotation from the top dead center (TDC) of each of the eight cylinders 100, respectively, from an engine speed sensor 50, a motor-generator speed sensor 52, a turbine speed sensor 54, a vehicle speed sensor 56, and a crank angle sensor 58. Apart from this, various information required for various control procedures is also supplied to the electronic control apparatus 70. The accelerator operation amount Acc corresponds to an output request amount.

Figure 5:
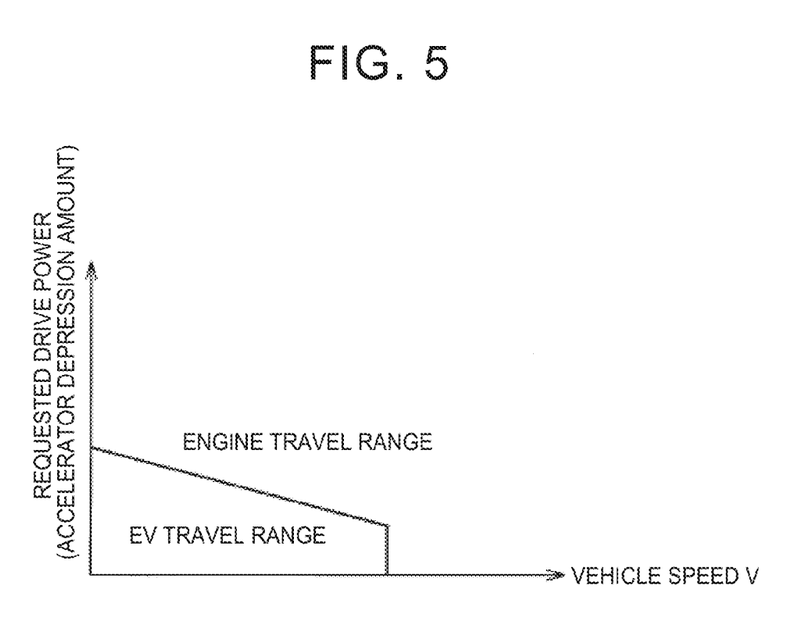
FIG. 5 is a diagram showing an example of a previously stored relationship for determining any one travel range of a motor travel range and an engine travel range, on the basis of the vehicle speed V and the requested output amount (accelerator depression amount), in hybrid travel control.

In functional terms, the electronic control apparatus 70 is provided with a hybrid control unit 72, a transmission control unit 74, an engine stop control unit 76 and an engine start control unit 80. The hybrid control unit 72 decides one travel range from among a motor travel range in which the vehicle travels using only the motor-generator MG as a drive power source, and an engine travel range in which the vehicle travels using only the direct injection engine 12, or both the direct injection engine 12 and the motor-generator MG as a drive power source, on the basis of the vehicle speed V and the requested drive power (accelerator depression amount), using a previously stored relationship as shown in FIG. 5, for example, and by controlling the operation of the direct injection engine 12 and the motor-generator MG, causes the vehicle to travel in one of a plurality of predetermined travel modes, such as the engine travel mode, or the motor travel mode, or an engine plus motor travel mode using both the engine and the motor-generator. The transmission control unit 74 controls the electromagnetic hydraulic control valves or switching valves, and the like, which are provided in the hydraulic control apparatus 28, to switch the engaged/released state of the plurality of hydraulic friction engaging apparatuses, whereby the plurality of gears of the automatic transmission 20 are switched in accordance with a predetermined relationship or transmission map, based on parameters relating to the driving state, such as the accelerator operation amount Acc and the vehicle speed V. This relationship or transmission map previously determines the operating point of the direct injection engine 12 or the motor-generator MG in such a manner that the requested drive power is satisfied with optimal fuel consumption or optimal efficiency.

The engine stop control unit 76 stops the supply of fuel to the direct injection engine 12 and fuel ignition, thereby stopping rotation of the direct injection engine 12, and releases the KO clutch 34 according to requirements, on the basis of an eco-run stop request which is output when idle stop conditions are established, such as an accelerator off operation, zero vehicle speed, D range, brake on, etc., or an engine stop request when switching from the engine travel range to the motor travel range during travel.

The engine start control unit 80 is provided with a TDC stop determination unit 82, an ignition start control unit 84, an engine operation determination unit 86, an electric motor assist control unit 88, and a restart control end determination unit 90, and in response to an engine restart request such as a brake off operation in the event of an idle stop, or a switch from the motor travel range to the engine travel range, the engine start control unit 80 restarts the direct injection engine 12 by implementing an ignition start of the direct injection engine 12 as well as implementing assist by the motor-generator MG, and terminates restart control when, for example, the rotational speed (engine revolutions) NE of the direct injection engine 12 have reached a previously established end determination value NE1, and then engages the KO clutch 34.

The TDC stop determination unit 82 determines whether or not the engine is in a stopped state where the crank angle CA of one of the cylinders of the direct injection engine 12, and more specifically, a prescribed second cylinder, is situated at the top dead center (TDC), on the basis of the signal $\phi$ from the crank angle sensor 58 which detects the crank angle CA from the top dead center (TDC) of the crank shaft 114 of the direct injection engine 12.

Figure 6:
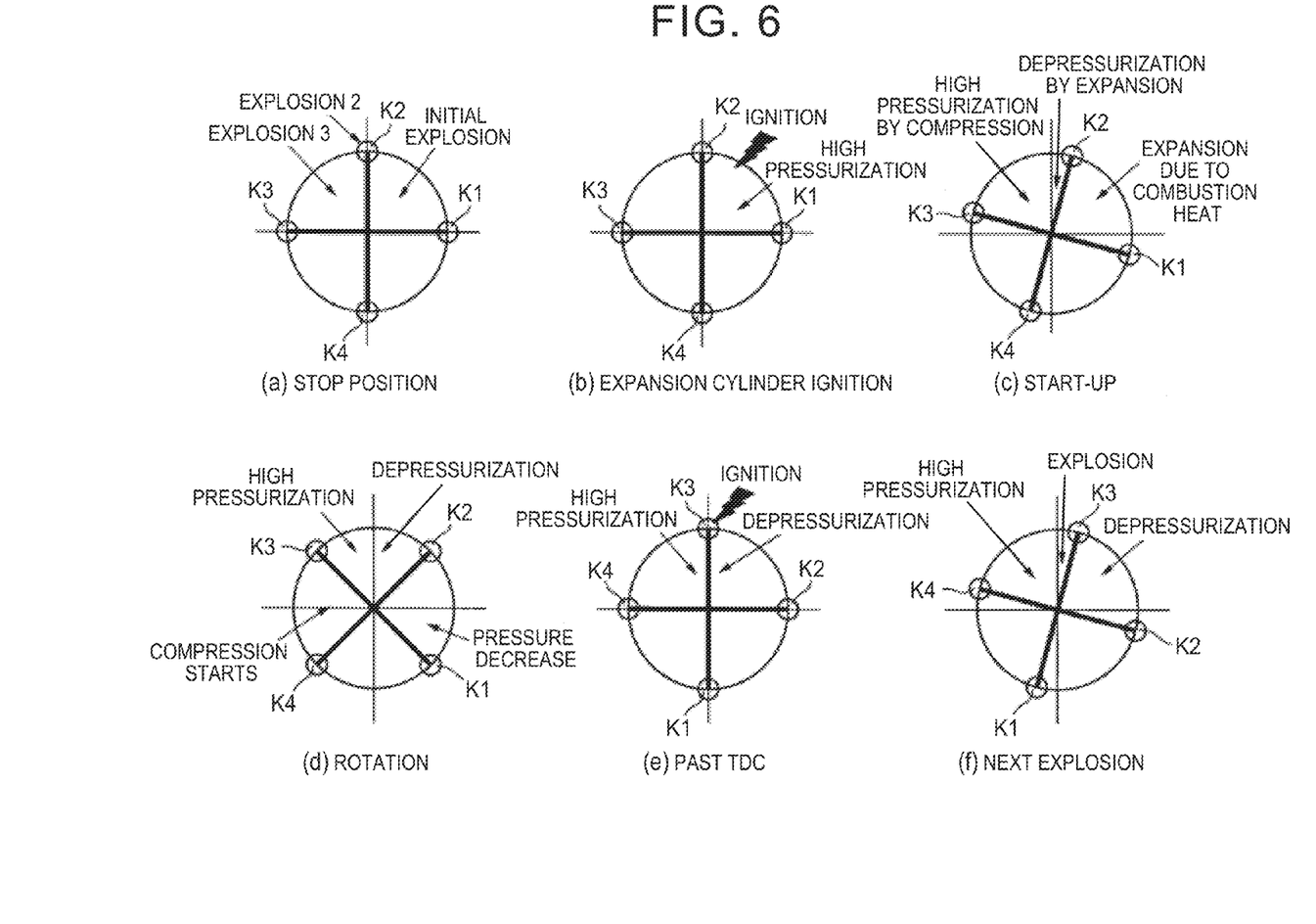

If the TDC stop determination unit 82 determines that the direct injection engine 12 is in a stopped state where one of the cylinders of the engine, and more specifically, the second cylinder, is situated at the compression TDC, then the ignition start control unit 84, in response to a restart request, injects fuel from the fuel injection apparatus 46 into the first cylinder K1 which is before the second cylinder in the ignition sequence, which is in an expansion stroke, and in which the exhaust valve is not open, and ignites the fuel by the ignition apparatus 47, thereby causing an initial explosion (first explosion), and raising the engine revolutions NE, in addition to which, a second explosion is caused subsequently in a similar fashion in the third cylinder K3, thereby further raising the engine revolutions NE. FIG. 6 is a cylinder phase diagram for describing the ignition start process performed by the ignition start control unit 84 in the V-8 four-cycle direct injection engine 12; in which FIG. 6A shows a stopped state where the second cylinder K2 is positioned at the compression TDC, FIG. 6B shows a state where fuel injection from the fuel injection apparatus 46 and ignition by the ignition apparatus 47 have been performed in a first cylinder K1 which is one before the second cylinder K2 in the ignition sequence, which is in an expansion stroke in this stopped state, and in which the exhaust valve is not open, FIG. 6C shows a state where an initial explosion has occurred due to the ignition in the first cylinder K1 and rotation has started (start-up) due to the torque produced by this initial explosion, and depressurization inside the second cylinder K2 and compression inside the third cylinder K3 have started, FIG. 6D shows a state where further rotation has occurred due to the torque produced by the initial explosion, and the depressurization in the second cylinder K2 and the compression inside the third cylinder K3 have progressed further, FIG. 6E shows a state where the third cylinder K3 in the compression stroke has reached the TDC and fuel injection from the fuel injection apparatus 46 and ignition by the ignition apparatus 47 have been carried out in the third cylinder K3, and FIG. 6F shows a state where further rotation has occurred due to the torque produced by a second explosion in the third cylinder K3, and the expansion in the third cylinder K3 and the compression in the fourth cylinder K4 have progressed further. The second explosion in the third cylinder K3 and the third explosion in the fourth cylinder K4 occur in a state where the air is compressed at the full stroke of the compression stroke, and therefore a relatively large torque is produced and the engine revolutions NE are raised suddenly and sustainably. In FIG. 6B above, although this is the timing where the volume inside the second cylinder K2 becomes a minimum, the air is not compressed, so fuel injection and ignition are not performed as an initial explosion in the first cylinder K1, a second explosion in the second cylinder K2 and a third explosion in the third cylinder K3, as in FIG. 6A which shows a case of normal continuous operation, and therefore there is no second explosion in FIG. 6A and the third explosion in FIG. 6A corresponds to the second explosion in FIG. 6F.

Figure 7:
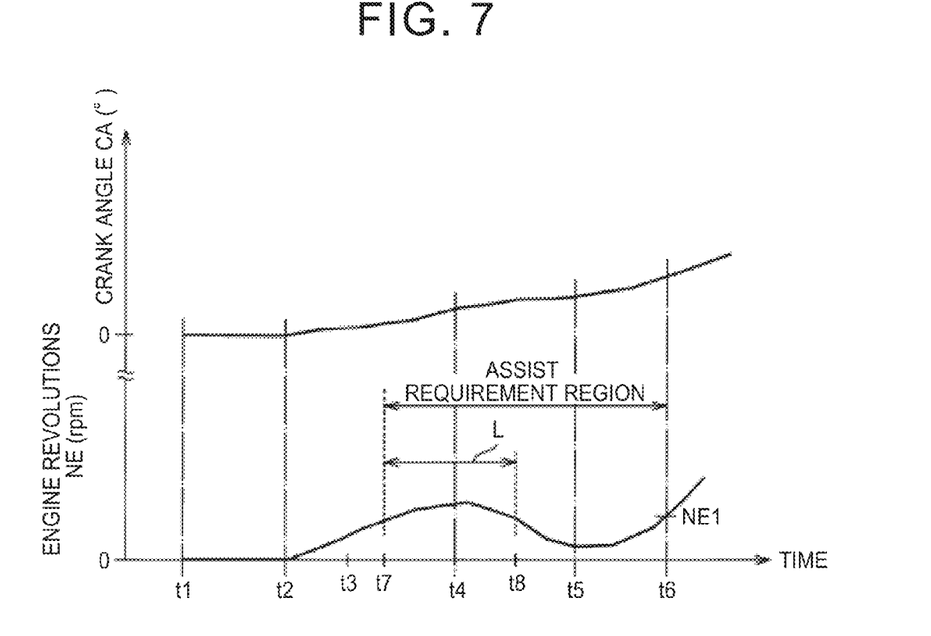
FIG. 7 is a time chart for illustrating change in a time sequence of the crank angle CA and the engine revolutions NE raised by ignition start control executed by the electronic control apparatus in FIG. 1.

FIG. 7 is a time chart for illustrating change in a time sequence of the crank angle CA and the engine revolutions NE achieved by ignition start control executed by the ignition start control unit 84. In FIG. 7, the waveform representing the engine revolutions NE corresponds to the differential waveform of the crank angle CA. FIGS. 6A, 6B, 6C, 6D, 6E and 6F respectively correspond to the time points t1, t2, t3, t4, t5 and t6 in FIG. 7. The example of a motor-generator assist request region shown in FIG. 7 has a start point for engaging the KO clutch 34 and performing torque assist by the motor-generator MG within a peak region L which is a section (time point t7 to time point t8) 20% lower than the upper peak, or maximum value, of the convex curve formed by the increase in the engine revolutions NE produced by the initial explosion, and has an end point where the engine revolutions NE have increased again from a minimum value due to the torque assist and have reached an self-powered operation engine revolutions NE1 which is set at around 400 rpm (time point t5).

The engine operation determination unit 86 determines whether or not rotation of the direct injection engine 12 is sustained after the initial explosion by the ignition start control unit 84, on the basis of the signal φ from the crank angle sensor 58. Since this signal φ is a pulse shaped signal, then a determination is made on the basis of whether or not the signal φ is input within a prescribed time period of approximately 50 ms, for example.

The electric motor assist control unit 88 immediately engages the KO clutch 34 and performs torque assist by the motor-generator MG, to raise the engine revolutions NE of the direct injection engine 12 again to the previously established self-powered operation engine revolutions NE1 or above, thereby restarting the direct injection engine 12, if the engine operation determination unit 86 has determined that rotation of the direct injection engine 12 has not been sustained after the initial ignition operation by the ignition start control unit 84, due to a misfire, or the like, in the direct injection engine 12. However, if the engine operation determination unit 86 has determined that the rotation of the direct injection engine 12 has been sustained after the initial explosion by the ignition start control unit 84, then in order to restart the direct injection engine 12 with as little electrical energy as possible, the KO clutch 34 is engaged and torque assist is performed by the motor-generator MG at the point where the engine revolutions NE raised by the initial explosion reach a maximum value, or at any timing within the peak section L, which is a range centered on the peak value and 20% lower than the maximum value. The assist torque produced by the motor-generator MG is set in such a manner that the engine revolutions NE have a minimum value after passing the maximum value, and subsequently rise again. By the assist torque set in this way, it is possible to restart the direct injection engine 12 using as little electrical energy as possible.

The restart control end determination unit 90 determines the end of restart control of the direct injection engine 12, in other words, the end of torque assist in restarting of the direct injection engine 12, on the basis of whether or not the engine revolutions NE, which have been raised by the ignition start control by the ignition start control unit 84 and which have been further raised by engagement of the KO clutch 34 and torque assist by the motor-generator MG implemented by the electric motor assist control unit 88, have reached the self-powered operation revolutions NE1 which is previously set to around 400 rpm, or whether or not the rate of change of the engine revolutions NE (the rate of increase or speed of increase) dNE/dt has reached a previously established independent operation increase rate dNE1/dt.

Figure 8:
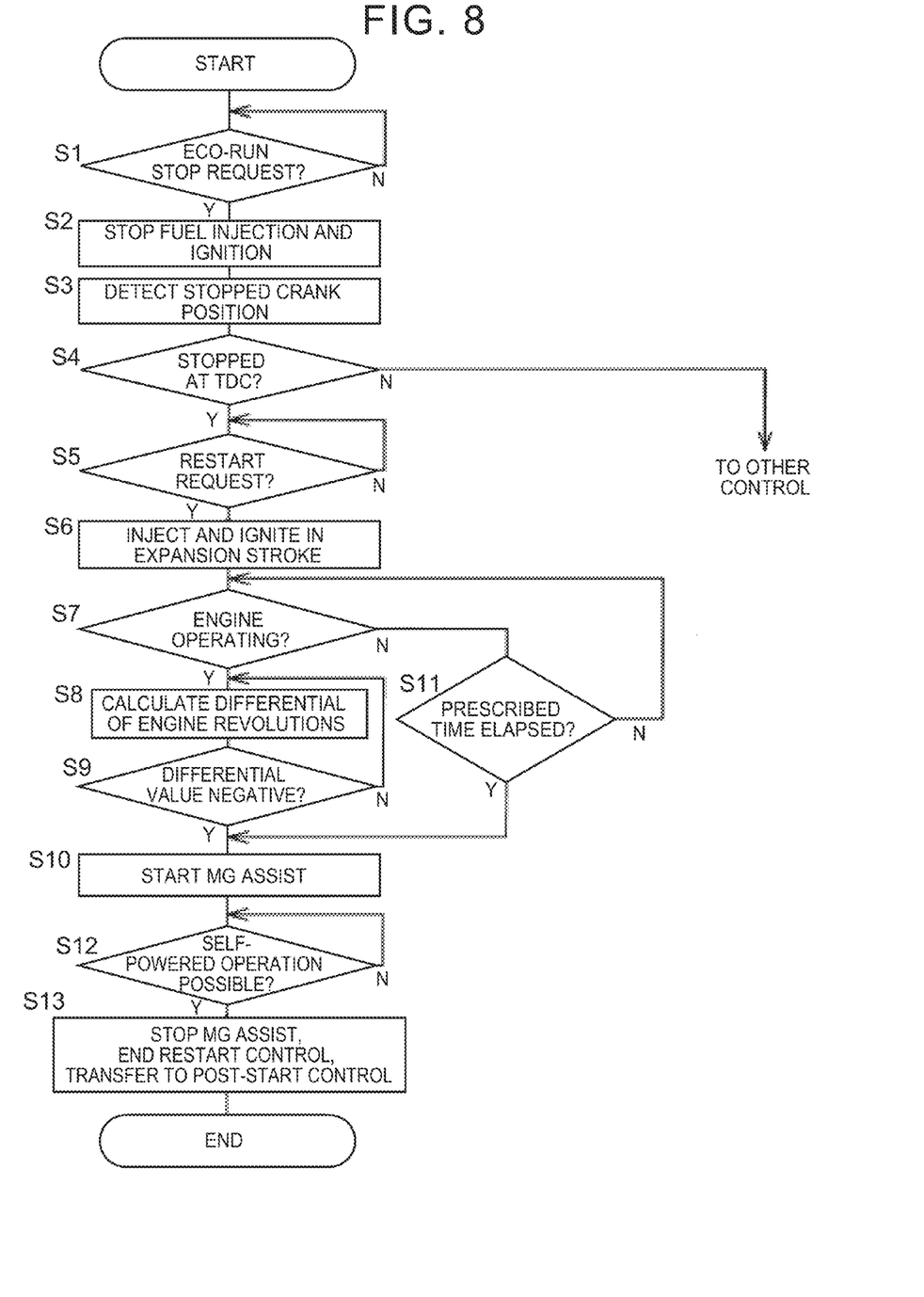
FIG. 8 is a flowchart illustrating the principal part, in other words, an engine start control routine, of a control operation of the electronic control apparatus in FIG. 1.

FIG. 8 is a flowchart illustrating a principal part of the control operation by the electronic control apparatus 70, which is carried out repeatedly at a cycle of several milliseconds to between 10 and 20 milliseconds, for example. In FIG. 8, in steps S1 (the term "step" is omitted below) to S2 which correspond to the engine stop control unit 76, fuel supply to the direct injection engine 12 is stopped and rotation of the direct injection engine 12 is stopped on the basis of an eco-run stop request output when an idle stop condition, such an accelerator off operation, zero vehicle speed, D range, brake on operation, or the like, has been established, or an engine stop request upon switching from an engine travel range to a motor travel range during travel, and the like, and furthermore if it is necessary to reduce the drag resistance of the direct injection engine 12, apart from cases where engine braking is required, then the KO clutch 34 is released.

Next, in S3 which corresponds to the TDC stop determination unit 82, the crank angle CA, in other words, the position at which the crank shaft 114 has stopped, is read in by the crank angle sensor 58 which detects the crank angle CA from the top dead center (TDC) of the crank shaft 114 of the direct injection engine 12, and furthermore, in S4 which corresponds to the TDC stop determination unit 82, it is determined whether or not the crank angle CA of any one of the cylinders of the direct injection engine 12 is positioned at the top dead center (TDC). If the determination in S4 is negative, then other control is implemented.

However, if the determination in S4 is affirmative, then in S5, it is determined whether or not an engine restart request has occurred due to a brake off operation in the event of an idle stop, or a switch from the motor travel range to the engine travel range, or the like. If the determination in S5 is negative, then a waiting action is performed by implementing S5 repeatedly. However, if a restart request occurs and the determination in S5 is affirmative, then in S6 which corresponds to the ignition start control unit 84, in a stopped state where any one cylinder of the direct injection engine 12, and more specifically, the second cylinder, is positioned at the compression TDC, an initial explosion (first explosion) is generated by injecting fuel from the fuel injection apparatus 46 into the first cylinder K1 which is an expansion stroke before the second cylinder in the ignition sequence, and igniting the fuel by the ignition apparatus 47, thereby raising the engine revolutions NE, and thereafter a second explosion is generated similarly in the third cylinder K3 and the engine revolutions NE are raised further. The period from time point t2 to time point t3 in FIG. 7 indicates the start of raising of the engine revolutions NE due to the initial explosion.

Thereupon, in S7 which corresponds to the engine operation determination unit 86, it is determined whether or not the engine revolutions NE are sustained and the direct injection engine 12 is operating, after the initial explosion, on the basis of, for example, whether or not the crank angle CA detected by the crank angle sensor 58 has changed (increased) or whether or not the pulse signal φ has been supplied from the crank angle sensor 58. If the determination in S7 is negative, then in S11, it is determined whether or not a prescribed wait time which is set previously at around 50 ms has elapsed since the negative determination in S7. While the determination in S11 is negative, the steps up to S7 are implemented repeatedly. However, if the determination in S11 is affirmative, then in S10 which corresponds to the electric motor assist control unit 88, engagement of the K0 clutch 34 and torque assist by the motor-generator MG is implemented immediately, and the engine revolutions NE are raised.

Since the determination in S7 is affirmative in cases where the engine revolutions NE are sustained and the direct injection engine 12 is operating after the initial explosion, then in S8, the differential dNE/dt of the engine revolutions NE is calculated, and in S9, it is determined whether or not the value of dNE/dt has changed from a positive value to a negative value. If the determination in S9 is negative, then the steps up to S8 are implemented repeatedly. However, if the differential value dNE/dt of the engine revolutions NE has changed from a positive value to a negative value and the determination in S9 is affirmative, then in S10 which corresponds to the electric motor assist control unit 88, engagement of the K0 clutch 34 and implementation of torque assist by the motor-generator MG are started immediately, whereby the engine revolutions NE are raised further. The time point t4 in FIG. 7 indicates this state, and the motor-generator assist region according to the present embodiment starts from this time point. The assist torque value produced by the motor-generator MG is set to a value by which the engine revolutions NE are raised and starting of the direct injection engine 12 is completed reliably, in conjunction with an ignition start by the ignition start control unit 84, while keeping the consumption of electrical energy as small as possible, and ultimately, the engine revolutions NE are raised after the minimum value (trough) indicated at time point t5 on FIG. 7.

Next, at S12 which corresponds to the restart control end determination unit 90, it is determined whether or not a self-powered (independent) operation state has been reached, on the basis of whether or not the engine revolutions NE have reached the self-powered operation revolutions NE1 set previously to around 400 rpm, or whether or not the rate of change of the engine revolutions NE (the rate of increase) dNE/dt has reached the previously established independent operation increase rate dNE1/dt. While the determination in S12 is negative, a waiting action is performed by implementing S12 repeatedly. However, if the determination in S12 is affirmative, then in S13 which corresponds to the electric motor assist control unit 88, the torque assist by the motor-generator MG is terminated and the torque assist for restarting the direct injection engine 12 is ended. In other words, the restart control for the direct injection engine 12 is completed. Time point t6 in FIG. 7 shows this state.

According to the engine start control apparatus of the hybrid vehicle 10 according to the present embodiment, as described above, when the direct injection engine 12 is started in a state where the second cylinder K2 of the plurality of cylinders is positioned at the top dead center TDC, the engine revolutions NE are raised by generating a first explosion in the first cylinder K1, which is situated before the second cylinder K2 in the ignition sequence, which is in an expansion stroke, and in which the exhaust valve is not open, by directly injecting fuel into the first cylinder K1 and igniting the fuel, in addition to which, within a peak section L immediately after the start of rise in the engine revolutions NE, and desirably at the time point t4 of the maximum value, assistance in increasing the engine revolutions NE is started by transmitting assist torque output from the motor-generator (rotary machine) MG to the direct injection engine 12 via the K0 clutch 34. Therefore, in a hybrid vehicle in which a direct injection engine 12 is connected to and disconnected from a power transmission path by a K0 clutch 34, the direct injection engine 12 which is stopped can be started by using a sufficient required assist torque. Furthermore, as a result of this, the consumption of the electrical energy of the accumulator apparatus when starting the direct injection engine 12 is small, and the electrical energy for starting the engine which needs to be reserved in the battery (accumulator apparatus) 44 at all times is small, and therefore the electric vehicle travel range, in other words, the electric motor travel range shown in FIG. 5, for example, can be increased, and the fuel consumption of the vehicle can be improved appropriately.

According to the engine start control apparatus for a hybrid vehicle 10 according to the present embodiment, since assistance of the raising of the engine revolutions NE by assist torque output from a motor-generator (rotary machine) MG is started in response to the time point t4 of a maximum value where the engine revolutions NE change from an initial increase due to the raising thereof to an initial decrease, and therefore an assist is performed in the vicinity of the maximum value immediately after raising of the engine revolutions NE, then the torque assist is started at an appropriate timing which does not waste mechanical energy to turn the crank shaft 114. Consequently, it is possible to start the direct injection engine 12 which is stopped by using a sufficient required assist torque, and furthermore the starting of the direct injection engine 12 can be performed rapidly.

Moreover, according to the engine start control apparatus for a hybrid vehicle 10 according to the present embodiment, a second explosion following the first explosion is produced in the third cylinder K3, which follows the second cylinder K2 in the ignition sequence, by direct injection and ignition of fuel into the third cylinder K3 near the top dead center of the third cylinder K3, and therefore the consumption of the electrical energy of the battery (accumulator apparatus) 44 in starting the direct injection engine 12 is made yet smaller, the electrical energy to be reserved for engine start at all times in the battery 44 is reduced, and consequently, the electric motor travel range is increased, and the fuel consumption of the vehicle is further improved.

Moreover, according to the engine start control apparatus for a hybrid vehicle 10 according to the present embodiment, assistance in increasing the engine revolutions NE by assist torque output from the motor-generator (rotary machine) MG is continued until the third cylinder K3 passes the top dead center, and therefore the direct injection engine 12 which is stopped can be started by using a sufficient required assist torque, and furthermore, starting of the direct injection engine 12 can be performed reliably.

Furthermore, according to the engine start control apparatus for a hybrid vehicle 10 according to the present embodiment, assistance for raising the engine revolutions NE by assist torque output from a motor-generator (rotary machine) MG is continued until the engine revolutions NE exceed a previously established revolutions determination value NE1 and/or it is determined that the rate of increase dNE/dt of the engine revolutions NE has reached a previously established independent operation rate of increase dNE1/dt, and therefore the direct injection engine 12 which is stopped can be started by using a sufficient required assist torque, in other words, electrical energy, and furthermore, starting of the direct injection engine 12 can be performed reliably.

Moreover, according to the engine start control apparatus for a hybrid vehicle 10 according to the present embodiment, the assist torque output from the motor-generator (rotary machine) MG is set to a magnitude whereby the engine revolutions NE first rise, then decline and then rise again, and therefore the direct injection engine 12 which is stopped can be started using a sufficient required assist torque, in other words, electrical energy, and furthermore, the consumption of the electrical energy of the battery (accumulator apparatus) 44 in starting the direct injection engine 12 can be made even smaller, the electrical energy for starting the engine which is to be reserved at all times in the battery 44 is reduced, and therefore the electric motor travel range is increased and the fuel consumption of the vehicle is improved yet further.

Furthermore, according to the engine start control apparatus for a hybrid vehicle 10 according to the present embodiment, if the revolutions NE of the crank shaft 114 of the direct injection engine 12 do not rise as a result of the first explosion in the first cylinder K1, then the engine revolutions NE are raised by transmitting assist torque output from the motor-generator (rotary machine) MG to the direct injection engine 12 via the KO clutch 34, and therefore if, for any reason, a rise in the engine revolutions NE cannot be achieved by beginning an ignition start, the assist torque output from the motor-generator MG is transmitted to the direct injection engine 12 via the KO clutch 34, and the engine revolutions NE are raised, thus guaranteeing the responsiveness of the starting operation.

An embodiment of the invention has been described in detail above with reference to the drawings, but the invention can also be applied to other modes.

For example, the direct injection engine 12 of the embodiment described above was a V-8 engine, but the invention can be applied to any direct injection engine in which, when a second cylinder has stopped at a TDC position, a first cylinder, which is one before the second cylinder in the ignition sequence, is in a compression stroke and the exhaust valve of that first cylinder is closed. Provided that the engine is a general engine where opening of the exhaust valve starts when after top dead center (ATDC) is 140° or less in the compression stroke, then the direct injection engine 12 may be provided with five or more cylinders. Therefore, if the direct injection engine 12 is a four-cycle direct injection engine having five or more cylinders, in other words, a six-cylinder, eight-cylinder or 12-cylinder direct injection engine, then when the direct injection engine is started in a state where a prescribed cylinder, the second cylinder, is positioned at the top dead center, there exists a first cylinder which is situated before that second cylinder in the ignition sequence, which is in an expansion stroke, and in which the exhaust valve is not open, and therefore it is possible to start the engine by raising the engine revolutions through directly injecting fuel into the first cylinder and igniting the fuel to produce a first explosion in the first cylinder, and by using a sufficient required assist torque. Moreover, as a result of this, the consumption of the electrical energy of the accumulator apparatus in starting the four-cycle direct injection engine having five or more cylinders is reduced, the electrical energy for engine starting that is to be reserved in the accumulator apparatus at all times is reduced, and therefore the electric motor travel range is increased and the fuel consumption of the vehicle is improved appropriately.

Moreover, the hybrid vehicle 10 according to the embodiment described above is provided with one motor-generator MG as a driving electric motor, but it is also possible to provide a second motor-generator which is provided on the output shaft of the automatic transmission 20 in FIG. 1, for example, and which drives the left and right drive wheels 26 via the vehicle differential gear apparatus 24. Moreover, in order to constitute a four-wheel-drive vehicle, a second motor generator which drives only the other wheels which are not shown in FIG. 1 (namely, the front wheels if the drive wheels 26 are the rear wheels) may also be provided.

Furthermore, in the hybrid vehicle 10 according to the embodiment described above, a torque converter 14 with a lock-up clutch 30 is provided between the KO clutch 34 and the automatic transmission 20, but this torque converter 14 does not necessarily have to be provided. Moreover, the C1 clutch 18 which functions as an input clutch of the automatic transmission 20 may be accommodated inside the automatic transmission 20, and may constitute one of the plurality of friction engaging apparatuses for achieving a transmission gear.

Furthermore, the automatic transmission 20 of the hybrid vehicle 10 according to the embodiment described above was a planetary gear type non-continuous transmission, but it may also be a belt-type continuous transmission, and does not necessarily have to be provided.

The foregoing is no more than one embodiment of the invention, and the invention can be implemented with various modifications and improvements on the basis of knowledge of a person skilled in the art, without departing from the spirit of the invention.

10: hybrid vehicle
12: direct injection engine
34: KO clutch (clutch)
44: battery (accumulator apparatus)
70: electronic control apparatus (engine start control apparatus)
80: engine start control unit
84: ignition start control unit
L: peak section
MG: motor-generator (rotary machine)

The invention claimed is:

1. An engine start control apparatus for a hybrid vehicle including a direct injection engine directly injecting fuel into cylinders, a clutch connecting and disconnecting the direct injection engine with respect to a power transmission path, and a rotary machine functioning at least as an electric motor, the direct injection engine and the rotary machine being able to be used as drive power sources for travel, comprising:

a controller which is configured to, when starting up the direct injection engine in a state where a second cylinder of a plurality of cylinders is positioned at top dead center, raise engine revolutions by producing a first explosion in a first cylinder situated before the second cylinder in an ignition sequence, the first cylinder being in an expansion stroke and an exhaust valve thereof not being open, by directly injecting fuel into the first cylinder and igniting the fuel, and start assistance in increasing the engine revolutions by transmitting assist torque output from the rotary machine to the direct injection engine via the clutch, in a peak section after the engine revolutions start to increase, the peak section being a section indicating engine revolutions of no less than a value having a prescribed ratio with respect to a maximum value between an increase section of the engine revolutions and a decrease section following increase section of the engine revolutions.

2. The engine start control apparatus for a hybrid vehicle according to claim 1, wherein assistance in increasing the engine revolutions by the assist torque output from the rotary machine is executed in response to the engine revolutions shifting to an initial decrease from an initial increase due to the raising of the engine revolutions.

3. The engine start control apparatus for a hybrid vehicle according to claim 2, wherein a second explosion following the first explosion is produced in a third cylinder following the second cylinder in the ignition sequence, by directly injecting fuel into the third cylinder and igniting the fuel near top dead center of the third cylinder.

4. The engine start control apparatus for a hybrid vehicle according to claim 3, wherein assistance in increasing the engine revolutions by the assist torque output from the rotary machine is continued at least until the third cylinder has passed the top dead center.

5. The engine start control apparatus for a hybrid vehicle according to claim 1, wherein assistance in increasing the engine revolutions by the assist torque output from the rotary machine is continued at least until the engine revolutions exceed a predetermined revolutions determination value and/or until a rate of increase of the engine revolutions exceeds a predetermined rate-of-increase determination value.

6. The engine start control apparatus for a hybrid vehicle according to claim 1, wherein the assist torque output from the rotary machine is set to a magnitude whereby the engine revolutions decrease temporarily after the increase and then increase again.

7. The engine start control apparatus for a hybrid vehicle according to claim 1, wherein the direct injection engine is provided with a plurality of cylinders being no fewer than five cylinders.

8. The engine start control apparatus for a hybrid vehicle according to claim 1, wherein, when rotation of a crank shaft of the direct injection engine is not raised by the first explosion in the first cylinder, the engine revolutions are increased by transmitting the assist torque output from the rotary machine to the direct injection engine via the clutch.

* * * * *